W. F. YANCEY.
TROLLEY FINDER.
APPLICATION FILED JULY 15, 1919.
1,347,239. Patented July 20, 1920.
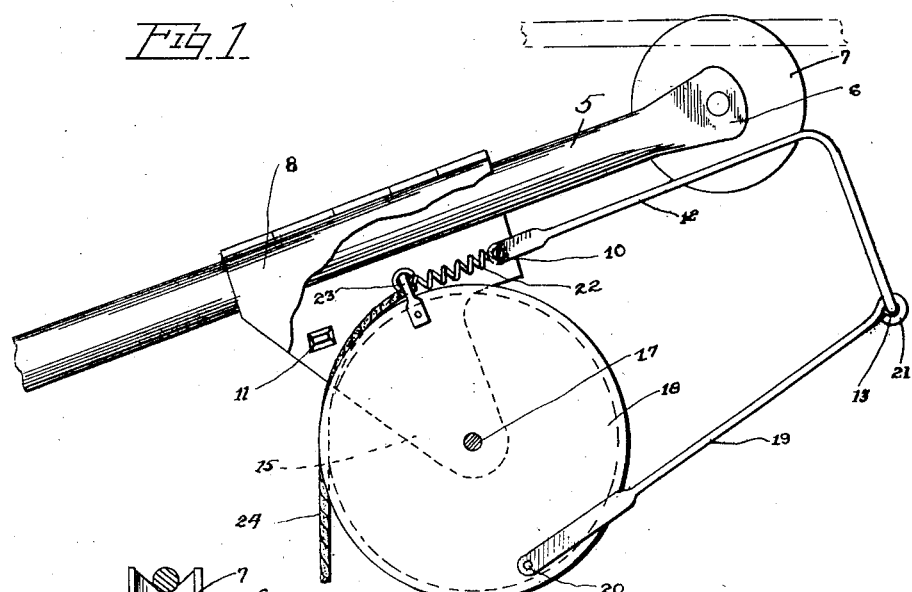
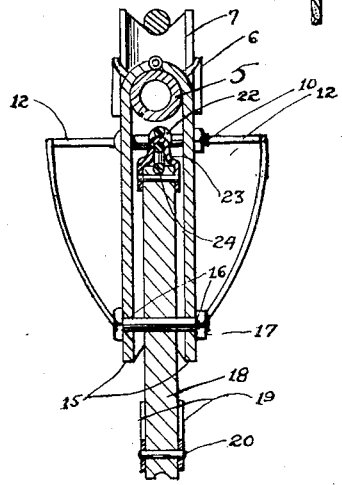
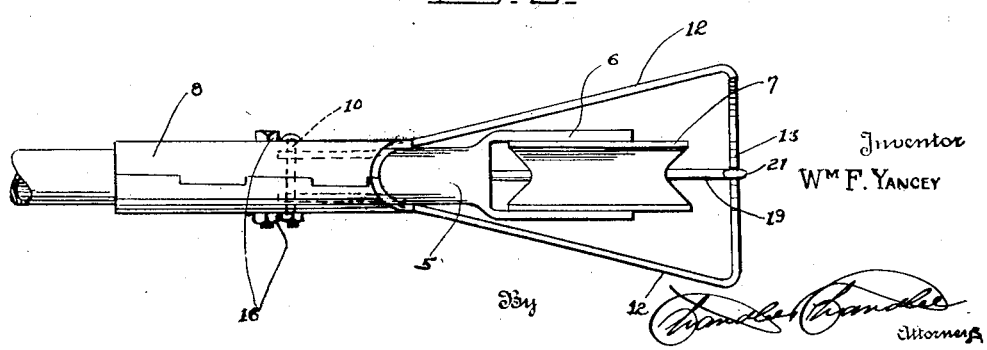
Inventor
W<sup>m</sup> F. Yancey

UNITED STATES PATENT OFFICE.

WILLIAM F. YANCEY, OF PORTSMOUTH, VIRGINIA.

TROLLEY-FINDER.

1,347,239.  Specification of Letters Patent.  Patented July 20, 1920.

Application filed July 15, 1919. Serial No. 310,892.

*To all whom it may concern:*

Be it known that I, WILLIAM F. YANCEY, a citizen of the United States, residing at Portsmouth, in the county of Norfolk, State of Virginia, have invented certain new and useful Improvements in Trolley-Finders; and I do hereby declare the following to be a full, clear, and exact description of the invention, such as will enable others skilled in the art to which it appertains to make and use the same.

This invention relates to trolley poles in general and more particularly to attachments for preventing the rising of the end of the trolley arm above the trolley wire when the trolley wheel leaves it and for facilitating the engagement of the wheel with the wire.

The object of the invention is to provide a construction that may be readily applied to and removed from the ordinary trolley arm, that will normally be in inactive position and which will be automatically moved to active position the moment a pull is exerted upon the trolley rope, either by reason of the wheel leaving the trolley wire or when the trolley is to be shifted.

In the drawings,

Figure 1 is a side view of the upper end portion of a trolley pole equipped with the present invention, the near side of the carrying sleeve being broken away to permit of better illustration of the working parts.

Fig. 2 is a vertical section through the pivot of the crank disk, looking in the direction of the trolley wheel.

Fig. 3 is a top plan view.

Referring now to the drawings, there is shown a trolley pole 5 of usual construction having the harp 6 and trolley wheel 7.

The present attachment includes a sleeve comprising a two-part body portion 8, having a hinge connection 9, so that they may be adjusted over the trolley pole 5, as illustrated and depending at both sides thereof.

Through the depending side portions of the body 8, directly adjacent to the under side of the trolley arm, is engaged a bolt 10, through the medium of which the hinged members are drawn together at their lower portions and thus clamped upon the trolley pole, and to limit this movement of the parts toward each other, a stop finger 11, is provided upon the inner face of one of the parts of the body portion, for engagement with the other part below the trolley pole.

The combined guard and finding member of the construction, consists of a yoke member comprising the spaced arms 12 and the connecting bight portion 13, the extremities of the arms 12 being perforated to receive pivotally the bolt 10, from which the arms range longitudinally of the trolley pole with first downward and then upward curvature, to the bight portion 13. The bight portion is sprung at its center sharply away from the trolley wheel 7, slightly beyond which it normally lies, the ends of the bight being spaced sufficiently apart and the bend being sufficient to permit the yoke to be swung upwardly with the ends of the bight spaced beyond the sides of and materially above the axis of the trolley wheel.

In practice, the yoke lies normally lower than the axis of the trolley wheel, so as not to interfere and strike the trolley wire hangers, but when a pull is exerted upon the trolley rope, the rear end of the yoke is swung upwardly with the curved bight 13 extending from a point above and beyond the axis of the trolley wheel to a corresponding point above and at the opposite side of the axis of the trolley wheel.

To hold the combined guard and finding yoke normally inactive and to move it to active position under the conditions stated, the sleeve sides are provided with depending ears 15, having alining perforations 16 in one of which is fixed a bolt 17 which is movable into and out of engagement with the other perforation as the side members of the body 8 are adjusted toward and away from each other, as upon application to and removal from the trolley pole.

The bolt 17, forms an axle or shaft for a crank disk 18, which is embraced by the bifurcation of one end of a pitman 19, pivotally connected to the disk by a pin 20, the other end of the pitman having pivotal connection through the medium of a terminal eye 21, with the central portion of the bight 13 of the yoke. It will be readily seen, that by oscillation of the crank disk, motion will be transmitted to the yoke to cause it to rise and fall.

The crank disk is held normally in position with the yoke lowered, by means of a helical spring 22, one end of which is engaged with a bail 23 that straddles and is pivotally connected with the crank disk. The other end of the spring is engaged about the clamping bolt 10. When the disk is rotated to carry its lower side rearwardly, the pitman is operated to raise the yoke, and for this purpose, the periphery of the disk is circumscribingly grooved and has connected thereto, one end of the trolley rope 24. When the disk is in position with the yoke lowered, the rope 24 is wound upon the disk to draw the rope upwardly and conversely, when the rope is unwound from the disk, the latter is rotated against the tendency of the spring, to operate the pitman and swing the yoke to active position.

With this construction it will be readily understood that with the lower end of the trolley rope fixed, the moment the trolley wheel leaves the wire, the yoke is swung upwardly so that the ends of the bight 13 project above and at both sides of the wire, to guard against further upward movement of the pole to position where it would strike and break the wire-hangers. Furthermore, when the trolley rope is drawn downwardly to shift the trolley, the yoke is first swung upwardly to its limit and the pole is then drawn downwardly to carry the wheel from the wire, the yoke remaining in position at the upper limit of its movement, and by reason of its wide lateral spread, being readily engageable with a trolley wire to direct the trolley wheel thereto.

It will of course be understood that where the character of the material will permit, the sleeve may be made integral instead of hinged, and that other modifications may be made within the purview of the appended claims.

What is claimed is:—

1. An attachment for trolley poles comprising a carrier for engagement upon the pole, a yoke pivoted to the carrier and comprising a bight portion centrally displaced in a direction of pivotal movement of the yoke, a crank disk rotatably mounted in the carrier, a pitman pivotally connecting the crank disk with the yoke for movement of the latter from the former, a trolley rope connected with the disk in position to be wound and unwound peripherally thereof, and means for holding the disk normally and yieldably with the yoke at that limit of its movement in the direction of displacement of the bight.

2. An attachment for trolley poles comprising a sleeve for engagement over the pole and having depending side portions, a clamping bolt engaged through the side portions and under the influence of which they are movable toward each other into clamping relation to the pole, a crank disk rotatably mounted between the side portions, a yoke comprising side arms pivoted at one end upon the bolt and having a connecting bight at their other ends centrally displaced in one direction of pivotal movement of the yoke, a trolley rope attached to the disk and adapted to be wound and unwound peripherally thereof, a spring connected with the disk and the bolt in position to hold the disk normally with the rope wound thereon and a pitman connecting the bight of the yoke with the disk.

In testimony whereof, I affix my signature, in the presence of a witness.

WILLIAM F. YANCEY.

Witness:
GEO. H. CHANDLEE.